United States Patent [19]

Corley

[11] Patent Number: 4,668,758
[45] Date of Patent: May 26, 1987

[54] CURE RATE CONTROL IN EPOXY RESIN COMPOSITIONS

[75] Inventor: Larry S. Corley, Houston, Tex.

[73] Assignee: Shell Oil Company, Houston, Tex.

[21] Appl. No.: 782,750

[22] Filed: Sep. 30, 1985

[51] Int. Cl.$^4$ .............................................. C08G 59/68
[52] U.S. Cl. ........................................ 528/91; 528/89; 528/90; 528/92; 528/408; 528/409; 528/413; 528/416
[58] Field of Search ..................... 528/88, 89, 90, 91, 528/92, 408, 409, 416, 413

[56] References Cited

U.S. PATENT DOCUMENTS

| 3,067,170 | 12/1962 | Carey ........................................ 528/91 |
| 3,352,826 | 11/1967 | McWhorter et al. ............ 528/91 X |
| 3,799,905 | 3/1974 | Holloway et al. ................. 528/91 X |
| 4,069,202 | 1/1978 | Carey . |
| 4,447,586 | 5/1984 | Shimp ............................... 528/91 X |
| 4,503,211 | 3/1985 | Robins ................................. 528/92 |

FOREIGN PATENT DOCUMENTS

| 2634229 | 8/1975 | Fed. Rep. of Germany . |
| 50-140600 | 4/1974 | Japan . |
| 53-114900 | 3/1977 | Japan . |
| 5605820 | 10/1979 | Japan . |
| 57082979 | 11/1980 | Japan . |

Primary Examiner—Earl Nielsen

[57] ABSTRACT

An epoxy resin composition containing a cationic curing agent and a cure-retarding amount of a diarylamine. The diarylamine lengthens the pot life of the epoxy-curing agent composition.

17 Claims, No Drawings

CURE RATE CONTROL IN EPOXY RESIN COMPOSITIONS

BACKGROUND OF THE INVENTION

This invention relates to epoxy resin compositions. In one aspect, it relates to the curing of epoxy resin compositions. In a specific embodiment, the invention relates to increasing the pot life of epoxy resin compositions containing cationic curing agents.

Cationic curing agents for epoxy resins, such as Lewis acids ($BF_3$ and $SnCl_4$, for example) and their complexes, protonic acids containing anions of low nucleophilicity ($HBF_4$, $HPF_6$, $HSbF_6$, $CF_3SO_3H$ and $H_2SO_4$, for example) and certain salts of these acids have a number of useful properties. Many of these curing agents will cure liquid epoxy resins to hard solids without the application of external heat within seconds or minutes after the resin and curing agent are mixed at room temperature. With some of the most active cationic curing agents, however, such as $HBF_4$, cure may occur so rapidly (ten seconds or less) that complete mixing of the resin and curing agent is difficult. Dispensing of the resin-curing agent mixture is also difficult because of the very short pot life of the mixed system. Although cure can be retarded somewhat by lowering the ratio of curing agent to resin, this does not completely alleviate the problem. Cure can still occur so rapidly that droplets of curing agent are encapsulated by thin layers of cured resin, preventing diffusion of the curing agent throughout the resin.

It would therefore be desirable to decrease the cure rate of such a resin-curing agent mixture so that a homogeneous mixture could be formed and dispensed before curing occurred. Ideally, such a mixture would have a latent period before cure and a rapid rate of development of cured properties after the onset of cure.

It is therefore an object of the present invention to provide novel epoxy resin compositions. It is a further object to increase the pot life of epoxy resin systems containing cationic curing agents.

SUMMARY OF THE INVENTION

According to the invention, the pot life of epoxy resin systems containing cationic curing agents is extended by the addition of a diarylamine to the system. The resulting composition containing an epoxy resin, a cationic curing agent and a diarylamine exhibits an extended latent period before cure and, upon the initiation of curing, a rapid evolution to the cured state. The diarylamine can be premixed with either the epoxy resin or the curing agent before preparation of the invention composition.

DETAILED DESCRIPTION OF THE INVENTION

The cure of an epoxy resin-curing agent composition can be retarded by the addition to the composition of a diarylamine. Suitable diarylamines include substituted and unsubstituted diphenylamines of the formula

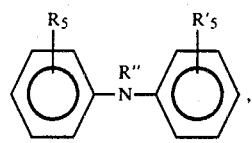

where each R and R' is selected independently from H, $C_1$–$C_{10}$ alkyl, hydroxyl halide and ArNH, and R'' is H or $C_1$–$C_{10}$ alkyl. Specific examples of such diarylamines include diphenylamine, N-methyldiphenylamine, 4,4'-dioctyldiphenylamine, 4-hydroxydiphenylamine and N,N'-diphenyl-p-phenylenediamine. Diphenylamines are commercially available as liquid mixtures of randomly alkylated diphenylamines, and such mixtures are suitable for use in the invention compositions.

The diarylamine will be present in the epoxy resin-curing agent composition in an amount effective to retard the cure of the epoxy resin. The diarylamine will generally be present in the mixture in an amount in the range of about 0.01 to about 20 weight percent, preferably about 1 to about 10 weight percent, based on the weight of the epoxy resin.

The epoxy resin component of the invention compositions can be any curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group containing compound is bisphenol-A are represented below by structure I wherein n is zero or a number greater than 0, commonly in the range of 0 to 10, preferably in the range of 0 to 2.

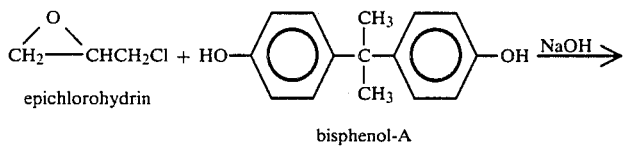

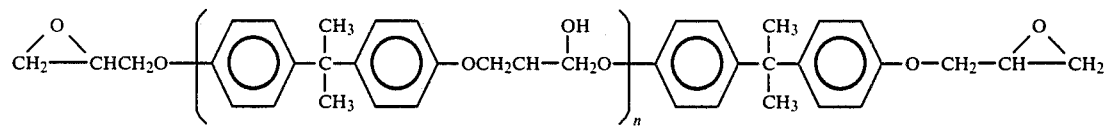

I

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially available epoxy resin EPON ® 828, a reaction product of epichlorohydrin and 2,2-bis(4-hydroxyphenyl)propane (bisphenol-A) having a molecular weight of about 400, an epoxide equivalent (ASTM D-1652) of about 185-192, and an n value in formula I above of about 0.2, is presently the preferred epoxy resin because of its wide applicability and commercial availability.

The epoxy resin will be used in combination with a curing agent. Many varieties of curing agents for epoxy resins are known in the art, including amines, acids and anhydrides. The invention method of retarding the cure of an epoxy resin composition containing a curing agent is particularly suitable for use with cationic curing agents. As is known in the art, "cationic curing agents" include Lewis acids and their complexes, protonic acids containing anions of low nucleophilicity and salts of such protonic acids. Specific examples of such cationic curing agents include, for example, $BF_3$, $SnCl_4$, $HBF_4$, $HPF_6$, $HSbF_6$, $CF_3SO_3H$, $H_2SO_4$, $BF_3 \cdot (C_2H_5)_2O$, and certain metal tetrafluoroborates such as $Sn(BF_4)_2$ and $Al(BF_4)_3$. Such curing agents will generally cure liquid epoxy resins at room temperature to hard solids within a few seconds or minutes after epoxy resin and curing agent are mixed.

The curing agent will be added to an epoxy resin in an amount which will effect curing of the resin to a solid under suitable curing conditions, which may include the application of heat to the epoxy resin. The curing agent will generally be present in an amount of about 0.01 to about 10 weight percent, based upon the weight of the epoxy resin, preferably about 0.5 to about 5 weight percent.

The invention composition may optionally contain a surfactant in an amount effective for promoting dispersion of the components, such as aqueous solutions of the curing agent and/or diarylamine, in the epoxy resin. The quantity of surfactant present in the composition can vary but will generally be within the range of about 0.01 to about 10 weight percent, based on the weight of the epoxy resin, preferably about 0.5 to about 5 weight percent. Nonionic surfactants are preferred, including linear or branched alcohol ethoxylates, linear or branched alkylphenolethoxylates, and ethylene-propylene oxide block copolyaers, for example.

The epoxy resin, curing agent and diarylamine can be combined as a mixture of the epoxy resin and diarylamine with the curing agent or as a mixture of the curing agent and diarylamine with the epoxy resin. Mixing is preferably carried out by combining, with vigorous stirring, a solution of the epoxy resin and diarylamine with a solution of the curing agent and surfactant.

The use of the diarylamine lengthens the pot life of an epoxy resin solution containing a cationic curing agent so that rapid gelation does not occur immediately upon mixing the epoxy resin and the curing agent. The diarylamine also has the effect of slowing the curing reaction so as to prevent gelation so rapid that the curing agent is "frozen" into the mixture and is unable to diffuse throughout the resin.

The invention composition is useful for such applications are coatings, structural composites and adhesives.

Specific embodiments of the invention composition and method for retarding epoxy resin cure rate are illustrated in the following examples.

EXAMPLE 1

EPON ® Resin 828 (25 grams) was weighed into a 100 ml polypropylene beaker along with the indicated amount (see Table 1 below) of a diarylamine (diphenylamine, Naugalube ® 438-L or Vanlube ® SL). Naugalube ® 438-L and Vanlube ® SL are randomly octylated or nonylated diphenylamines. The epoxy resin and diarylamine were then mixed thoroughly with a wooden tongue depressor. One gram of a commercial 48% aqueous solution of tetrafluoroboric acid was added to each mixture. The mixture was then stirred rapidly with a wooden tongue depressor and time to gelation was determined. In all cases, the gel became hard within a few seconds after gelation occurred. Table 1 shows the results of tests of gel time for the invention and control compositions.

TABLE 1

| Additive | g | Gel Time (sec.) |
|---|---|---|
| None | | 9 |
| Diphenylamine | 0.5 | 19 |
| | 1 | 38 |
| Naugalube 438-L | 1 | 70, 142 (repeat determinations) |
| | 2 | 124, 165 |
| Vanlube SL | 0.25 | 30, 38, 145 |
| | 0.5 | 140 |
| | 1 | 415 |

The results shown in Table 1 show that the diarylamine additives increased the time to gelation of the resin-$HBF_4$ mixture. Gel time generally increased with increasing concentration of diarylamine.

EXAMPLE 2

Two modified epoxy resins were prepared by mixing respectively 4 and 8 parts of Naugalube 438-L with 100 parts of EPON ® Resin 828 until homogeneous solutions were formed. Two curing agent mixtures were prepared by mixing 2 parts of 48% aqueous tetrafluoroboric acid and 50% aqueous stannous tetrafluoroborate with 1 part of NEODOL ® 91-6, a nonionic surfactant which aids dispersion of the aqueous solutions in the epoxy resin and improves reproducibility of gelation rate.

Twenty-five grams of epoxy resin or modified epoxy resin were weighed into a 100 ml polypropylene beaker, followed by the indicated amount of curing agent (see Table 2 below). The mixture was then stirred rapidly and time to gelation was determined. In all cases, the gel became hard soon after gelation.

TABLE 2[a]

| | Curing Agent Mixture | |
|---|---|---|
| Resin Mixture | 2 Parts 48% Aqueous $HBF_4$ 1 Part NEODOL 91-6 | 2 Parts 50% Aqueous $Sn(BF)_2$ 1 Part NEODOL 91-6 |
| EPON Resin 828 | 1 phr - 13 Seconds (Did Not Fully Gel) 2 phr - 8 Seconds | 2 phr - 70 Seconds 4 phr - 70 Seconds |

TABLE 2(a)-continued

| Resin Mixture | Curing Agent Mixture | |
|---|---|---|
| | 2 Parts 48% Aqueous HBF₄ 1 Part NEODOL 91-6 | 2 Parts 50% Aqueous Sn(BF)₂ 1 Part NEODOL 91-6 |
| 100 Parts EPON Resin 828 4 Parts Naugalube 438-L | 1 phr - 142 Seconds 2 phr - 70 Seconds 4 phr - 30 Seconds | 8 phr - 70 Seconds 2 phr - 235 Seconds 4 phr - 212 Seconds 8 phr - 145 Seconds |
| 100 Parts EPON Resin 828 8 Parts Naugalube 438-L | 2 phr - 175 Seconds 4 phr - 75 Seconds 8 phr - 18 seconds | 4 phr - 320 Seconds 8 phr - 190 Seconds |

(a)Parts curing agent mixture per 100 parts resin mixture versus seconds to gelation after mixing (∼25 g mass).

From the data in Table 2, it can be seen that the diarylamine additive (Naugalube 438-L) is effective in controlling the gelation rate of the epoxy resin in cure by both the aqueous HBF₄-NEODOL 91-6 mixture and the aqueous Sn(BF₄)₂-NEODOL 91-6 mixture. Increasing the concentration of Naugalube 438-L increases the time to gelation, while increasing the concentration of HBF₄ or Sn(BF₄)₂ (in the presence of Naugalube 438-L) decreases the time to gelation.

It should be noted also that a hard gel could be obtained with 1 phr of the HBF₄ based curing agent in EPON Resin 828 containing 4 phr of Naugalube 438-L. In the absence of the diarylamine, however, the mixture did not fully gel. It is likely that without the diarylamine, local gelation occurred so fast that the HBF₄ became trapped in the gel particles and unable to diffuse into the mass of resin. The Naugalube 438-L prevented the extremely rapid local gelation, allowing full mixing of the HBF₄ with the resin before gelation occurred.

What is claimed is:

1. A composition comprising:
   (a) an epoxy resin;
   (b) a cationic curing agent for the epoxy resin selected from the group consisting of protonic acids having anions of low nucleophilicity and metal salts of such protonic acids; and
   (c) a diarylamine present in an amount effective to retard cure of the epoxy resin by the curing agent.

2. The composition of claim 1 in which the curing agent is selected from the group consisting of HBF₄, HPF₆, HSbF₆, CF₃SO₃H, H₂SO₄, Sn(BF₄)₂, Al(BF₄)₃ and Mg(BF₄)₂.

3. The composition of claim 1 in which the diarylamine can be represented by the formula

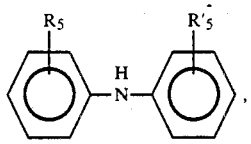

wherein each R and R' is selected independently from H, C₁-C₁₀ alkyl, halogen, hydroxyl and ArNH—.

4. The composition of claim 3 in which the diarylamine is diphenylamine.

5. The composition of claim 3 in which the diarylamine is present in the composition in an amount of about 0.01 to about 20 weight percent, based on the weight of the epoxy resin.

6. The composition of claim 5 in which the curing agent is present in the composition in an amount of about 0.01 to about 10 weight percent, based on the weight of the epoxy resin.

7. The composition of claim 6 in which the epoxy resin is a reaction product of epichlorohydrin and bisphenol-A having a molecular weight of from about 340 to about 1500.

8. The composition of claim 7 which further comprises a surfactant.

9. A method for retarding the cure of an epoxy resin by a cationic curing agent selected from the group consisting of HBF₄, HPF₆, HPF₆, HSbF₆, CF₃SO₈H, H₂SO₄, Sn(BF₄)₃ and Mg(BF₄)₂ comprising incorporating in a mixture of the epoxy resin and the cationic curing agent from about 0.01 to about 20 weight percent, based on the weight ofthe epoxy resin, of a diarylamine.

10. The method of claim 9 is which the epoxy resin is a reaction product of epichlorohydrin and bisphenol-A having a molecular weight in the range of about 340 to about 1500.

11. The method of claim 9 in which the cationic curing agent is selected from the group consisting of HBF₄, HPF₆, HSbF₆, CF₃SO₃H, H₂SO₄, Sn(BF₄)₃ and Mg(BF₄)₂.

12. The method of claim 11 in which the mixture of the epoxy resin and the cationic curing agent further comprises a surfactant.

13. The method of claim 11 in which the diarylamine can be represented by the formula

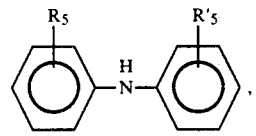

wherein each R and each R' is selected independently from H, C₁-C₁₀ alkyl, halogen, hydroxyl and ArNH—.

14. The method of claim 13 in which the diarylamine is mixed first with the epoxy resin and the resulting epoxy resin-diarylamine composition is then mixed with the cationic curing agent.

15. The method of claim 13 in which the cationic curing agent is present in an amount of from about 0.5 to about 5 weight percent and the diarylamine is present in an amount of about 1 to about 10 percent, based on the weight of the epoxy resin.

16. The composition of claim 1 in which the curing agent is HBF4 and the diarylamine is an alkylated diphenylamine.

17. The method of claim 9 in which the curing agent is HBF4 and the diarylamine is an alkylated diphenylamine.

* * * * *